United States Patent
Asano et al.

(10) Patent No.: US 7,710,509 B2
(45) Date of Patent: May 4, 2010

(54) LIQUID CRYSTAL DISPLAY APPARATUS COMPRISING A SLIDE MOUNTING BRACKET

(75) Inventors: Takashi Asano, Saitama (JP); Hiroki Sakurada, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 11/964,514

(22) Filed: Dec. 26, 2007

(65) Prior Publication Data

US 2009/0059115 A1 Mar. 5, 2009

(30) Foreign Application Priority Data

Sep. 4, 2007 (JP) ............... 2007-228496

(51) Int. Cl.
*G02F 1/1333* (2006.01)
(52) U.S. Cl. .................................. 349/58; 362/634
(58) Field of Classification Search .............. 349/58, 349/60; 362/632–634; 353/119; 361/600; 345/905
See application file for complete search history.

(56) References Cited

U.S. PATENT DOCUMENTS 6,507,484 B2 * 1/2003 Fukuyoshi ............ 361/679.26
2004/0090560 A1 * 5/2004 Jang ....................... 348/836

FOREIGN PATENT DOCUMENTS

JP 2005241964 9/2005

* cited by examiner

*Primary Examiner*—Thoi V Duong
(74) *Attorney, Agent, or Firm*—Pillsbury Winthrop Shaw Pittman, LLP

(57) ABSTRACT

A front cover (1) is engaged with a plate-like slide mounting bracket (3b), a liquid crystal panel (2) is fixed to the front cover (1) by a panel contact portion (31) of the slide mounting bracket (3b), and a back cover (5) is fixed to the front cover (1) through the plate-like slide mounting bracket (3b) by screwing a screw into a tapped hole (33). As a result, it is possible to narrow a width (b) which is obtained by subtracting a width of an overlap portion of the liquid crystal display panel (2) from a width (B) of a frame portion of the front cover (1) because no fixing boss for mounting the back cover (5) is required for the front cover (1). Consequently, the frame of the front cover (1) can be narrowed.

10 Claims, 4 Drawing Sheets

100 LIQUID CRYSTAL DISPLAY APPARATUS
4 CHASSIS
1 FRONT COVER
3b SLIDE MOUNTING BRACKET
2 LIQUID CRYSTAL PANEL
7 BRACKET
6 STAND

5 BACK COVER
33A SCREW
31 PANEL CONTACT PORTION
33 TAPPED HOLE
3b SLIDE MOUNTING BRACKET
30 SLIT
10 CLAW
1 FRONT COVER
11 GUIDE RIB
32 SUNK PORTION
2 LIQUID CRYSTAL PANEL

2

LIQUID CRYSTAL DISPLAY APPARATUS COMPRISING A SLIDE MOUNTING BRACKET

The present application is based on Japanese patent application No. 2007-228496 on Sep. 4, 2007 the entire contents of which are incorporated herein by reference.

BACKGROUND

1. Field

One embodiment of the invention relates to a liquid crystal display apparatus.

2. Description of the Related Art

A liquid crystal display apparatus in which a frame is narrowed by using a side-mount structure is known as the prior art in this technical field. This liquid crystal display apparatus, for example, is described in the Japanese Patent Kokai No. 2005-241964.

The liquid crystal display apparatus described in the Japanese Patent Kokai No. 2005-241964 includes a front cover having screw insertion holes in its side surface, a frame having screw holes in its side surface, a liquid crystal panel which is held in a space portion provided in the frame and is fitted into an inner side of the front cover to be fixed to the front cover, and fixing screws which are inserted through the respective screw insertion holes of the front cover to be screwed into the respective screw holes of the frame, thereby fixing the front cover and the frame to each other. The frame is constructed without disposing the space portion and the screw holes on the same plane. Also, none of lengths of the fixing screws exerts an influence on a frame width of the front cover. As a result, the frame of the front cover can be narrowed.

However, according to the conventional liquid crystal display apparatus described above, since the frame has a shape covering the side surface of the liquid crystal panel, the shape of the frame exerts an influence on the frame width of the front cover. Thus, there is a limit to the narrowing of the frame of the front cover. In addition, there is encountered a problem that a thickness of the liquid crystal display apparatus increases because the space portion and the screw holes are not disposed on the same plane.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF PREFERRED EMBODIMENTS

Figure 1:
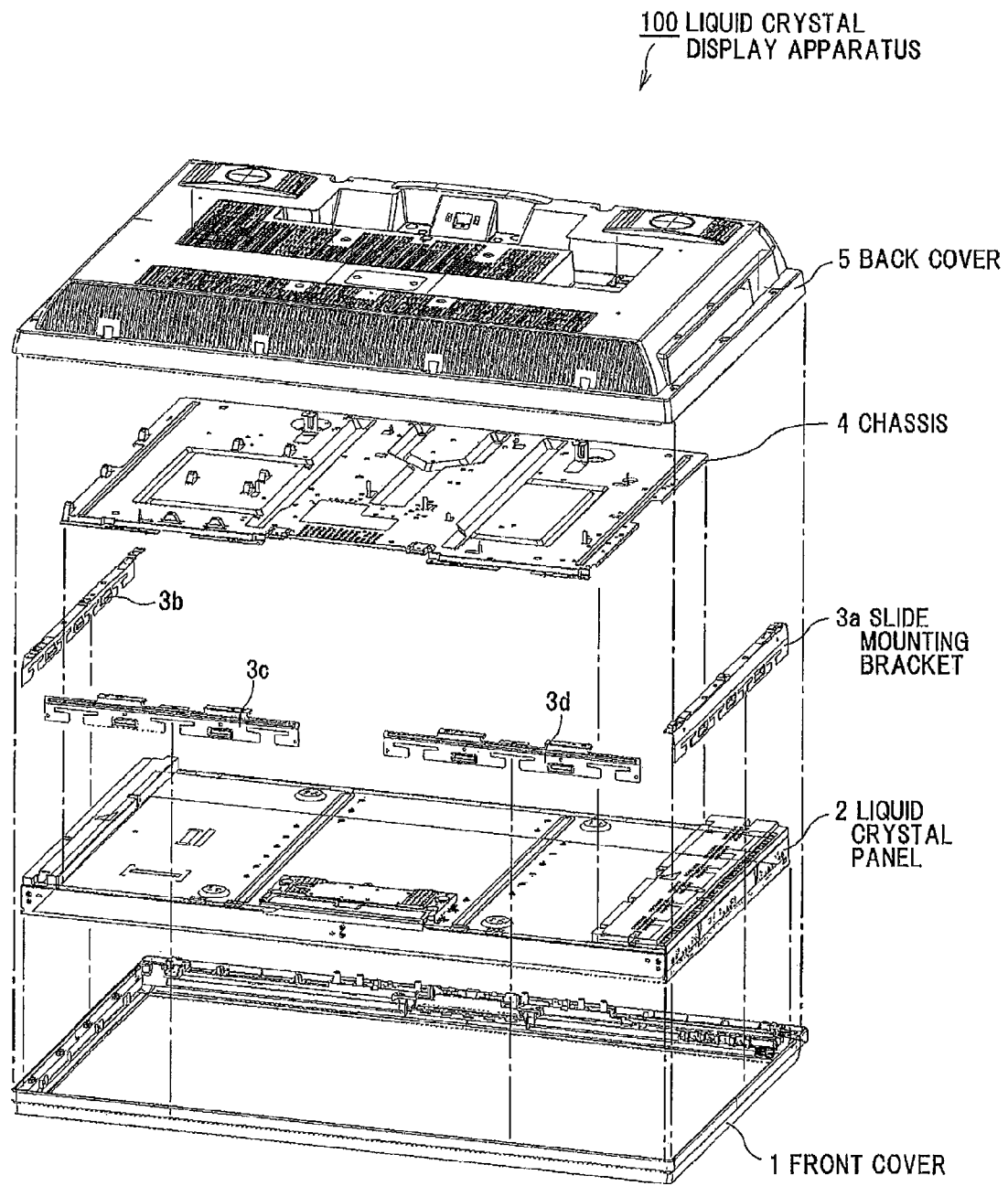
FIG. 1 is an exploded perspective view showing a construction of a liquid crystal display apparatus according to an embodiment of the present invention.

Various embodiments according to the invention will be described hereinafter with reference to the accompanying drawings. In general, according to one embodiment of the invention, there is provided a liquid crystal display apparatus, including: a slide mounting bracket having a slit and a panel contact portion; and a front cover having a claw adapted to be engaged with the slit; in which the slide mounting bracket is engaged with the claw, and the panel contact portion presses a liquid crystal panel against the front cover, thereby fixing the liquid crystal panel to the front cover.

According to the one embodiment of the invention, the front cover is engaged with the slide mounting bracket, and the liquid crystal panel is fixed to the front cover by the panel contact portion of the slide mounting bracket. Therefore, none of fixing members such as a screw and a boss is required for the front cover, which results in that it is possible to narrow a frame of the front cover.

According to a further embodiment of the invention, there is provided a liquid crystal display apparatus, including: a slide mounting bracket, formed into a plate, having a slit and a panel contact portion, the panel contact portion being provided in a direction vertical to a surface having the slit formed therein; and a front cover having a claw adapted to be engaged with the slit; in which the slide mounting bracket is engaged with the claw, and the panel contact portion presses a liquid crystal panel against the front cover, thereby fixing the liquid crystal panel to the front cover.

According to the further embodiment of the present invention, in addition to the effect offered by the one embodiment of the invention, an effect can be offered in which an influence exerted on the frame width of the front cover by the slide mounting bracket as the fixing member can be kept to a minimum because the slide mounting bracket is formed into the plate.

Also, according to a still further embodiment of the invention, there is provided a liquid crystal display apparatus, including: a slide mounting bracket, formed into a plate, having a slit and a panel contact portion, the panel contact portion being provided in a direction vertical to a surface having the slit formed therein; and a front cover having a claw adapted to be engaged with the slit; in which the slide mounting bracket is engaged with the claw, the panel contact portion presses a liquid crystal panel against the front cover, thereby fixing the liquid crystal panel to the front cover, the panel contact portion has a tapped hole formed therein, and a back cover is adapted to be mounted by screwing a screw into the tapped hole.

According to the still further embodiment of the invention, in addition to the effect offered by the one embodiment of the invention, an effect can be offered in which a frame of the front cover can be narrowed because no fixing boss for mounting the back cover is required for the front cover.

According to the embodiments of the invention, the liquid crystal panel can be fixed because the influence exerted on the frame width of the front cover can be suppressed.

Hereinafter, an embodiment of the invention will be described in detail with reference to the accompanying drawings.

(Construction of Liquid Crystal Display Apparatus)

FIG. 1 is an exploded perspective view showing a construction of a liquid crystal display apparatus according to an embodiment of the present invention.

A liquid crystal display apparatus 100 includes a front cover 1 as a chassis, a liquid crystal panel 2 unitized to have a backlight, slide mounting brackets 3a to 3d, each serving as a fixing member, which fix the liquid crystal panel 2 to the front cover 1, a chassis 4 which is coupled and fixed to the slide mounting brackets 3a to 3d by a fitting (not shown) and which is mounted with a plurality of circuit boards for control, and a back cover 5, serving as a chassis, which is fixed to the front cover 1 through the slide mounting brackets 3a to 3d by using screws which will be described later.

Figure 2:
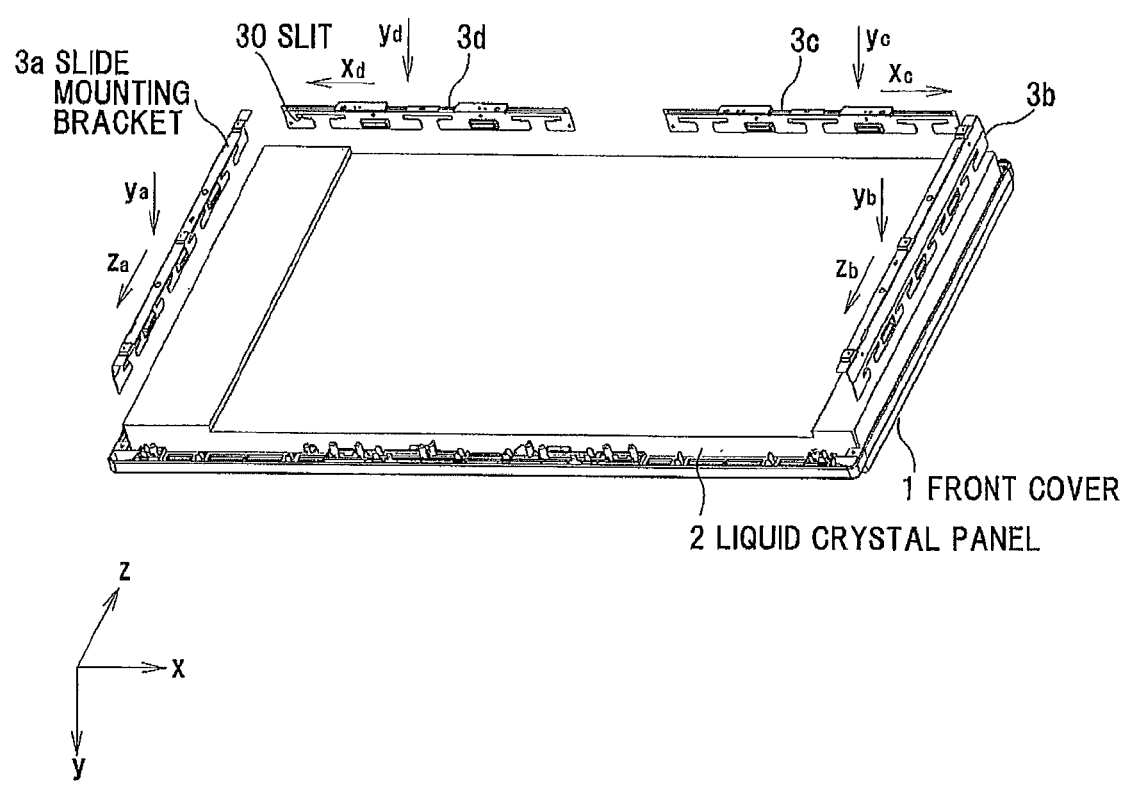
FIG. 2 is a perspective view showing a part of the construction of the liquid crystal display apparatus according to the embodiment of the present invention.

FIG. 2 is a perspective view showing a part of the construction of the liquid crystal display apparatus according to the embodiment of the present invention.

After the liquid crystal panel 2 is fitted into the front cover 1, slits 30 which are formed in the slide mounting brackets 3a to 3d, respectively, are engaged with claws provided in the front cover 1, thereby making it is possible to fix the liquid crystal panel 2 to the front cover 1. The slide mounting bracket 3a is firstly inserted into the front cover 1 in a $y_a$ direction, and is then slid in a $z_a$ direction to be fixed to the front cover 1. The slide mounting bracket 3b is firstly inserted into the front cover 1 in a $y_b$ direction, and is then slid in a $z_b$ direction to be fixed to the front cover 1. The slide mounting bracket 3c is firstly inserted into the front cover 1 in a $y_c$ direction, and is then slid in an $x_c$ direction to be fixed to the front cover 1. Also, the slide mounting bracket 3d is firstly inserted into the front cover 1 in a $y_d$ direction, and is then slid in an $x_d$ direction to be fixed to the front cover 1. It is noted that the z direction represents an elevational direction during installation of the liquid crystal display apparatus 100, and the y direction represents a direction of the front of the liquid crystal panel 2.

Figure 3A:
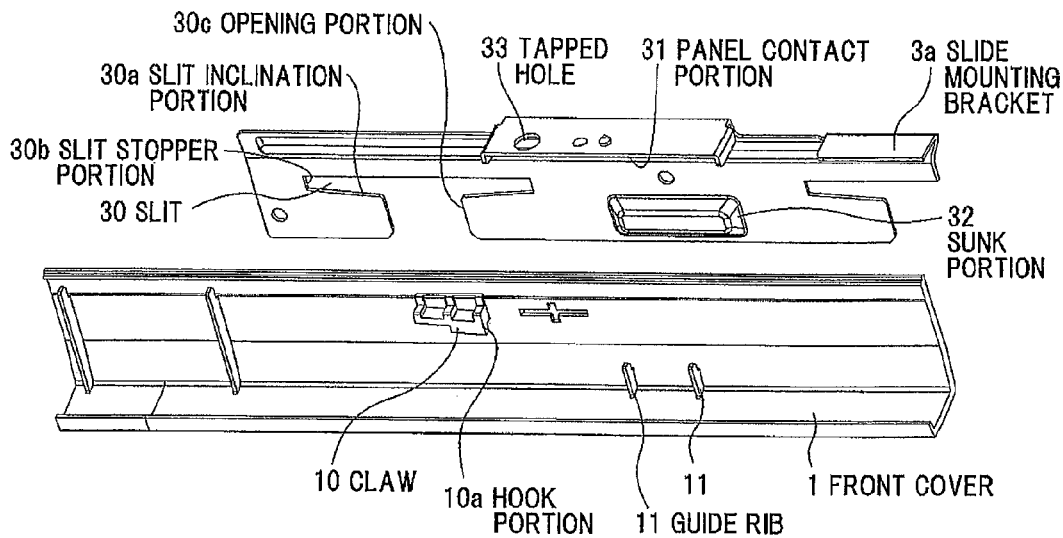
FIGS. 3A to 3C are respectively perspective views showing a procedure for mounting a slide mounting bracket of the liquid crystal display apparatus according to the embodiment of the present invention.
Figure 3B:
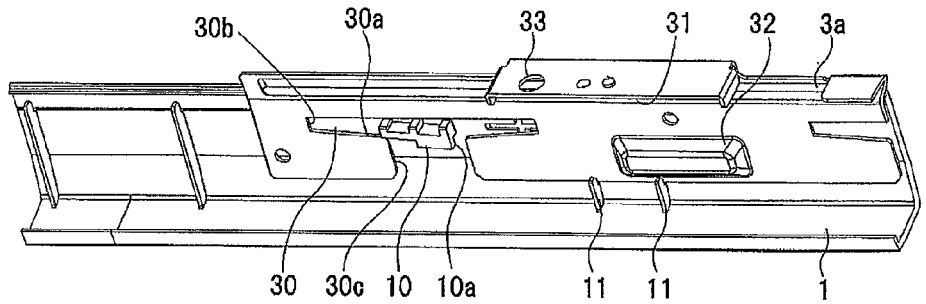
Figure 3C:
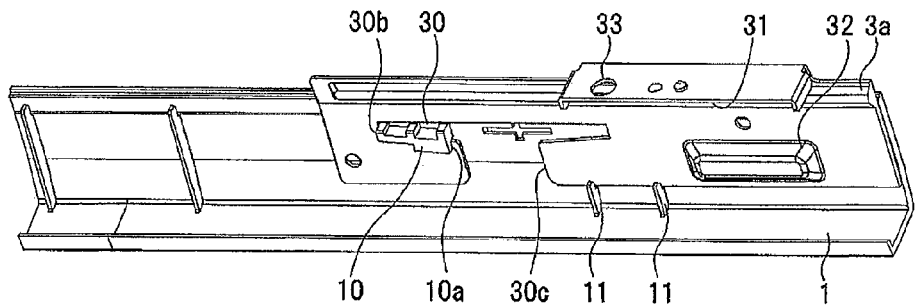

FIGS. 3A to 3C are respectively perspective views showing a procedure for mounting the slide mounting brackets of the liquid crystal display apparatus according to the embodiment of the present invention. It is noted that since the slide mounting brackets 3a to 3d have the same construction, the slide mounting brackets 3a and 3b will be described below on behalf of the slide mounting brackets 3a to 3d.

The slide mounting bracket 3a is formed by, for example, pressing an electro-galvanized steel plate such as SECC, and includes the T-like slit 30, a panel contact portion 31 which is formed by subjecting a part of the slide mounting bracket 3a to a bending work, and which serves to press the liquid crystal panel 2 against the front cover 1, a sunk portion 32 which supports the liquid crystal panel 2 from a side surface side, and a tapped hole 33 into which a screw as will be described later is screwed to fix a back cover 5 to the slide mounting bracket 3a with them.

The slit 30 includes a slit inclination portion 30a having an inclination at a lower edge shown in FIG. 3A, a slit stopper portion 30b which completes a sliding operation of the slide mounting bracket 3a after being engaged with a claw 10 which will be described later, and an opening portion 30c which is provided so as to extend from a member end portion to the slit insertion portion 30a, and which serves to introduce thereinto the claw 10. It is noted that since the slit 30 has the T-like shape, reverse of the slide mounting bracket 3a makes it possible to use the same parts in the left-hand and right-hand sides of the front cover 1, respectively. That is to say, the slide mounting bracket 3a and the slide mounting bracket 3b can be formed in the form of the same part, and also the slide mounting bracket 3c and the slide mounting bracket 3d can be formed in the form of the same part.

The front cover 1 is made of a material such as a PC/ABC resin or an ABC resin. In addition, the front cover 1 includes the claw 10 which is engaged with the slit 30 of the slide mounting bracket 3a, and guide ribs 11 each of which serves as a positioning guide when the slide mounting bracket 3a is slid.

Firstly, as shown in FIG. 3A, the slide mounting bracket 3a is put into the front cover 1 so that the claw 10 is guided into the slit 30 through the opening portion 30c.

Next, as shown in FIG. 3B, the slide mounting bracket 3a is slid while being brought into contact with the guide ribs 10, so that the slit 30 is hooked at a hook portion 10a of the claw 10. A surface of the claw 10 contacting the slit inclination portion 30a is an inclined surface which is inclined so as to come down from the left-hand side to the right-hand side of FIG. 3B. As a result, the claw 10 is readily slid along the slit inclination portion 30a to be inserted into the slit 30.

Next, after the slide mounting bracket 3a is slid in the manner as described above, as shown in FIG. 3C, the slide mounting bracket 3a is slid on the front cover 1 until a left-hand end of the claw 10 abuts against the slit stopper portion 30b. In this state, an inclination shaped portion of the claw 10 is brought into contact with the slit inclination portion 30a. As a result, the slide mounting bracket 3a is reliably engaged with the claw 10.

Figure 4A:
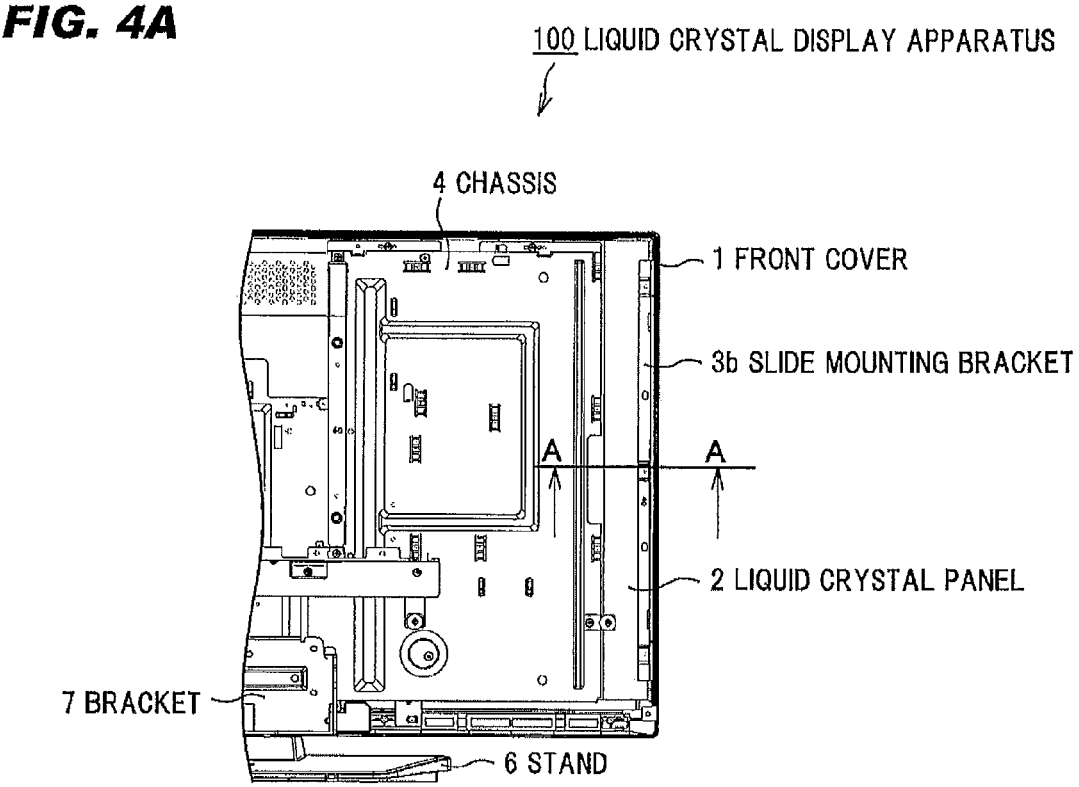
FIGS. 4A and 4B are respectively a back view and a partial cross sectional view, taken on line A-A of FIG. 4A, showing the construction of the liquid crystal display apparatus according to the embodiment of the present invention.
Figure 4B:
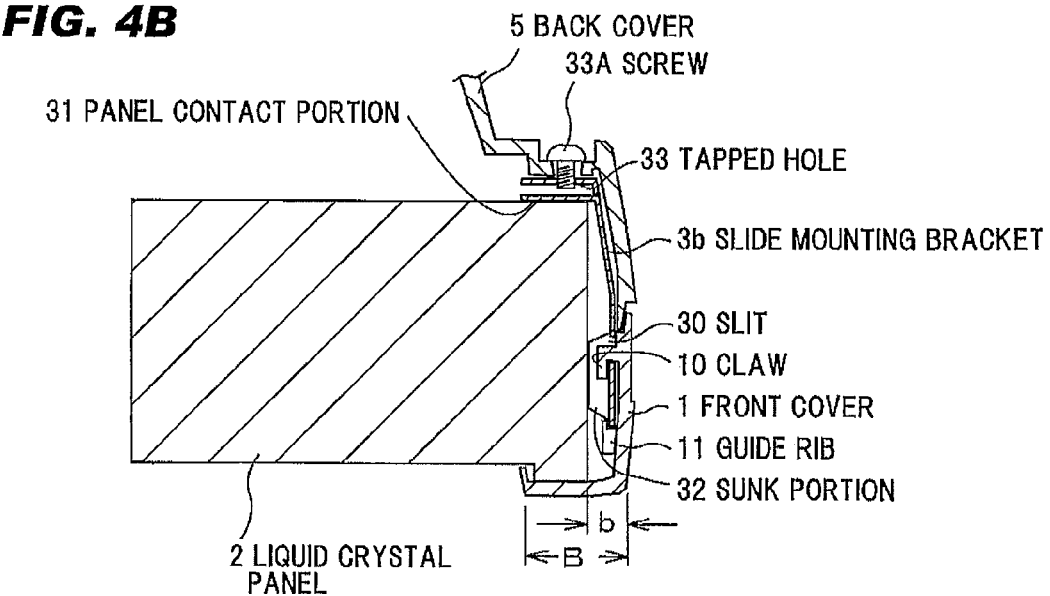

FIGS. 4A and 4B are respectively a back view and a partial cross sectional view, taken on line A-A of FIG. 4A, showing the construction of the liquid crystal display apparatus according to the embodiment of the present invention.

FIG. 4A shows a back surface of the liquid crystal display apparatus 100 after the slide mounting brackets 3a to 3d are mounted to the front cover 1. It is noted that no back cover 5 is mounted to the front cover 1. In addition, a stand 6 is mounted to the chassis 4 through a bracket 7.

FIG. 4B is a partial cross sectional view taken on line A-A of FIG. 4A. Also, FIG. 4B shows a state in which the back cover 5 is mounted to the front cover 1. The liquid crystal panel 2 is fitted into the front cover 1. Also, the panel contact portion 31 presses the liquid crystal panel 2 downward in the drawing, and the sunk portion 32 presses the liquid crystal panel 2 to the left-hand side in the drawing, thereby fixing the slide mounting bracket 3b with which the front cover 1 is engaged. The back cover 5 is fitted to the front cover 1, and is fixed thereto by screwing a screw 33A into a tapped hole 33 of the slide mounting bracket 3b. Here, in the figure, reference symbol B designates a width of a frame portion of the front cover 1, and reference symbol b designates a width which is obtained by subtracting a width of an overlap portion of the liquid crystal panel 2 from the width B of the frame portion of the front cover 1.

According to the embodiment described above of the invention, the front cover 1 is engaged with the plate-like slide mounting bracket 3b(3a), the liquid crystal panel 31 is fixed to the front cover 1 by the panel contact portion 31 of the plate-like slide mounting bracket 3b(3a), and the back cover 5 is fixed to the front cover 1 through the plate-like slide mounting bracket 3b(3a) by screwing the screw 33A into the tapped hole 33. As a result, it is possible to narrow the width b which is obtained by subtracting the width of the overlap portion of the liquid crystal display panel 2 from the width B of the frame portion of the front cover 1 because no fixing boss for mounting the back cover 5 is required for the front cover 1. Consequently, the frame of the front cover 1 can be narrowed.

It should be noted that the present invention is not limited to the embodiment described above, and the various combinations and changes may be made without departing from or changing the technical idea of the present invention.

What is claimed is:

1. A liquid crystal display apparatus, comprising:
a slide mounting bracket, formed into a plate, having a slit and a panel contact portion, the panel contact portion being provided in a direction vertical to a surface having the slit formed therein; and
a front cover having a claw adapted to be engaged with the slit;
wherein the slide mounting bracket is engaged with the claw, the panel contact portion presses a liquid crystal panel against the front cover, thereby fixing the liquid crystal panel to the front cover, the panel contact portion has a tapped hole formed therein, and a back cover is adapted to be mounted by screwing a screw into the tapped hole.

2. The liquid crystal display apparatus according to claim 1, wherein the front cover has a guide rib for guiding the slide mounting bracket.

3. The liquid crystal display apparatus according to claim 1, wherein the slide mounting bracket has a sunk portion, and the sunk portion presses a side surface of the liquid crystal panel, thereby fixing the liquid crystal panel.

4. The liquid crystal display apparatus according to claim 1, wherein the slit has an inclination portion having a shape in which a slit width becomes narrower along a direction of insertion of the claw.

5. A liquid crystal display apparatus, comprising:
a slide mounting bracket having a slit and a panel contact portion; and
a front cover having a claw adapted to be engaged with the slit;
wherein the slide mounting bracket is engaged with the claw, the panel contact portion presses a liquid crystal panel against the front cover, thereby fixing the liquid crystal panel to the front cover, the panel contact portion has a tapped hole formed therein, and a back cover is adapted to be mounted by screwing a screw into the tapped hole.

6. The liquid crystal display apparatus according to claim 5, wherein the slide mounting bracket has a sunk portion, and the sunk portion presses a side surface of the liquid crystal panel, thereby fixing the liquid crystal panel.

7. The liquid crystal display apparatus according to claim 5, wherein the slit has an inclination portion having a shape in which a slit width becomes narrower along a direction of insertion of the claw.

8. A liquid crystal display apparatus, comprising:
a slide mounting bracket having a slit and a panel contact portion; and
a front cover having a claw adapted to be engaged with the slit and a guide rib for guiding the slide mounting bracket;
wherein the slide mounting bracket is engaged with the claw, and the panel contact portion presses a liquid crystal panel against the front cover, thereby fixing the liquid crystal panel to the front cover.

9. The liquid crystal display apparatus according to claim 8, wherein the slide mounting bracket has a sunk portion, and the sunk portion presses a side surface of the liquid crystal panel, thereby fixing the liquid crystal panel.

10. The liquid crystal display apparatus according to claim 8, wherein the slit has an inclination portion having a shape in which a slit width becomes narrower along a direction of insertion of the claw.

* * * * *